United States Patent
Beuke et al.

(10) Patent No.: US 7,365,117 B2
(45) Date of Patent: Apr. 29, 2008

(54) POLYETHYLENE FORMULATIONS

(75) Inventors: Don Beuke, Bartlesville, OK (US); Phil Pickett, Terre Haute, IN (US); Prakash Patel, Terre Haute, IN (US); Shawn Lucas, Brazil, IN (US); Prashant Trivedi, Terre Haute, IN (US); Nilesh Savargaonkar, Terre Haute, IN (US)

(73) Assignee: Ampacet Corporation, Tarrytown, NY (US)

( * ) Notice: Subject to any disclaimer, the term of this patent is extended or adjusted under 35 U.S.C. 154(b) by 305 days.

(21) Appl. No.: 11/002,952

(22) Filed: Dec. 2, 2004

(65) Prior Publication Data

US 2006/0122294 A1    Jun. 8, 2006

(51) Int. Cl.
*C08K 5/04* (2006.01)

(52) U.S. Cl. ............... 524/377; 524/230; 524/232; 524/384; 524/386; 524/387; 524/388; 524/585; 524/586

(58) Field of Classification Search ............. 524/230, 524/232, 377, 380, 384, 386, 387, 388, 450, 524/456, 585, 586, 587
See application file for complete search history.

(56) References Cited

U.S. PATENT DOCUMENTS

| | | | | |
|---|---|---|---|---|
| 2,956,035 | A | * 10/1960 | Mock | ............... 524/231 |
| 3,773,743 | A | 11/1973 | Ainsworth et al. | ........ 260/94.9 |
| 4,410,649 | A | * 10/1983 | Cieloszyk | ............... 524/108 |
| 6,569,933 | B1 | * 5/2003 | Tonnvik et al. | ............ 524/444 |

* cited by examiner

*Primary Examiner*—Ling-Sui Choi
(74) *Attorney, Agent, or Firm*—Jack Schwartz & Associates, PLLC

(57) ABSTRACT

An ethylene polymer composition having improved optical properties and masterbatch for producing the composition comprising a predetermined amount of clarifying agent, and a predetermined amount of an amide slip agent.

10 Claims, 11 Drawing Sheets

COMMERCIAL ANTIBLOCKING AGNETS

DIATOMACEOUS EARTH

TALC

SILICA A

SILICA B

Antiblock

Figure 3

Effect of Masterbatch on DSC melting temp. (Tm) and crystallization temperature (Tc)

NOTE: higher Tc means lower frost line
(faster crystallization and at a higher temperature)

| % 102286 masterbatch | LLDPE Tc | LLDPE Tm | LDPE Tc | LDPE Tm |
|---|---|---|---|---|
| None | 107.6 | 123.4 | 97.6 | 111.0 |
| 1% | 113.3 | -------- | 99.6 | ------ |
| 2% | 115.0 | 124.4 | 100.3 | 111.0 |

Figure 4A

Customer Trial – April 04

| Property | ASTM | Units | #10 Control | #11 Barefoot | #12 1%MB | #13 2% MB |
|---|---|---|---|---|---|---|
| Haze | D1003 | % | 7.43 | 5.56 | 5.34 | 5.0 (-33%) |
| Clarity | D1003 | % | 92.8 | 96.6 | 95.9 | 95 |

Figure 4B

Customer Trial – April 04

| Property | ASTM | Units | #10 Control | #11 Barefoot | #12 1%MB | #13 2%MB |
|---|---|---|---|---|---|---|
| MD TS @ break | D882 | Psi | 4046 | 4135 | 4595 | 4397 |
| MD Elong | D882 | % | 243 | 246 | 317 | 322 |
| MD Sec Modulus | D882 | Psi | 23183 | 35616 | 37687 | 43546 (+88%) |
| TD TS @ break | D882 | Psi | 3334 | 3529 | 3258 | 3302 |
| TD Elong | D882 | % | 676 | 757 | 684 | 708 |
| TD Sec Modulus | D882 | Psi | 27217 | ???? | 48722 | 55435 (+104%) |
| TDtear Elmdorf | D1922 | Grams | 345 | 312 | 405 | 516 (+50%) |

High Clarity Masterbatch for LDPE Cast Film

- Haze
  - 26-42% reduction
- Blocking Force
  - 75-77% reduction
- C of F
  - 0.11 – 0.14

- 37 micron cast film of 1.5 mils:
  - 99-97% LDPE 0.925 density
  - 1-3% 102286

High Clarity Masterbatch for LLDPE Cast Film

- Haze
  - 52-60% reduction
- Blocking Force
  - 56-77% reduction
- C of F
  - 0.14-0.18

- 37 micron cast film: 1.5mils
  - 99-97% LLDPE 0.924 density
  - 1-3% 102286

High Clarity Masterbach for LLDPE Blown Film

- Haze vs control
  - 65% reduction

- Gloss vs control
  - 97% increase

- C of F
  - Low of 0.141

- TD Elmdorf tear
  - 50% increase

- 32 micron blown film: 1.25mils
  - 99-97% hexene LLDPE 0.919 density
  - 1-3% 102286

POLYETHYLENE FORMULATIONS

BACKGROUND OF THE INVENTION

1. Field of the Invention

The present invention relates generally to a polyolefin composition and, more specifically, to polyethylene (PE) formulations being formed from a high clarity slip antiblock masterbatch. The inventive PE masterbatch contains a clarifying agent, a high clarity antiblock and an amide slip additive. This results in at least one of a Low Density Polyethylene (LDPE) and a Linear Low Density Polyethylene (LLDPE) article produced by either a cast, blown or molding process having an increased gloss, a reduced haze, a reduced coefficient of friction (CoF) and a reduced blocking force.

2. Description of the Prior Art

Present PE films may be formed from a masterbatch including clarifiers, antiblocks and slip agents. These masterbatches can be used to form the PE film as at least one of a LDPE and a LLDPE. Alternatively, the PE film may be formed barefoot which means there are no additives contained therein. Additionally, the masterbatches may be used to produce a high density polyethylene (HDPE) film. However, the HDPE films are not the concern of the present invention and will not be discussed further.

The use of masterbatches containing antiblocks, clarifiers and slip agents allow the manufacturer to give the resultant PE film certain desirable properties. Antiblocks are used to prevent blocking which is the adhesion of two adjacent layers of PE film. Blocking generally occurs when the distance between two adjacent layers of film is reduced such as when the films are pressed or rolled together. One result of blocking is an increased difficulty of separating two layers of film, either removing film from a roll or opening a thin guage bag. The antiblock, when combined in a PE resin, microscopically protrudes from the surface thereof. These protrusions minimize the contact of the two adjacent layers of film thus making it easier to separate these layers. Common antiblocks that are utilized in PE formulations include silica (diatomaceous earth) and talc. However, these anitblocks cause the PE film to have a reduced clarity and reduced gloss.

Slip agents are further added to masterbatches to reduce the CoF of the film formulation. Slip agents must exhibit good lubricity and also must be incompatible with polyethylene. When the slip agents are incorporated into the PE resin, they migrate to the surface and form a thin film. Common slip agents include oleamide and erucamide with the latter providing a more significant reduction in the CoF of the resulting PE film.

It is thus desirable to produce a masterbatch used in producing a PE film wherein the masterbatch significantly reduces haze, the CoF, and blocking force. It is also desirable to produce a masterbatch that results in a PE film having an increased gloss.

SUMMARY OF THE PRESENT INVENTION

The present invention relates generally to a polyolefin composition and, more specifically, to PE formulations being formed from a high clarity slip antiblock masterbatch. The inventive PE masterbatch contains a proprietary clarifying agent and an amide slip additive and may also contain a high clarity antiblock or other additives or pigments to provide special properties. This results in at least one of a LDPE and a LLDPE article produced by either a cast, blown or molding process having an increased gloss, a reduced haze, a reduced CoF and a reduced blocking force.

It is a primary object of the present invention to produce a masterbatch for use in producing a polyethylene film that overcomes the limitations of prior art masterbatches.

It is a further object of the present invention to produce a masterbatch including a clarifier and an amide slip agent in a PE carrier resin.

It is a still further object of the present invention to produce a masterbatch wherein the PE carrier resin is at least one of a LDPE and a LLDPE. However, other carrier resins may be utilized as well in combination with the inventive masterbatch. Specifically, these resins may include but are not limited to HDPE, medium density polyethylene (MDPE) and other ethylene copolymers.

A yet further object of the present invention is to produce a masterbatch wherein the clarifier is Bis (p-ethylbenzylidene sorbitol) which can be stabilized by the addition of an amide slip agent. Clarifying agents, in general and especially those of the sorbitol-type, functioning by becoming molten at normal PE film processing temperatures but crystallizing sooner than the molten PE thereby acting as nuclei for crystallizing PE forming an array of small crystallites of PE resulting in improved clarity of the PE film. Since sorbitols are prone to decompose at PE film processing temperatures, the presence of an amide slip retards this decomposition.

Another object of the present invention is to produce a masterbatch wherein the amount of clarifier therein ranges substantially between 5% and 20% by weight, and more preferably is substantially 10% by weight.

Still a further object of the present invention is to produce a masterbatch that when used in producing a PE film, the PE film includes an amount of clarifier therein ranging substantially between 0.1% and 0.3% by weight.

An even further object of the present invention is to produce a masterbatch wherein the antiblock is a high clarity antiblock that is at least one of sodium calcium aluminino-silica hydrate having a particle size provided within a range of between substantially 3-5 microns.

Another object of the present invention is to produce a masterbatch wherein the amount of high clarity antiblock therein ranges substantially between 5% and 20% by weight, and preferably is substantially 10% by weight.

Still a further object of the present invention is to produce a masterbatch that when used in producing a PE film, the PE film includes an amount of high clarity antiblock therein ranging substantially between 0.1% and 0.3% by weight.

A still further object of the present invention is to produce a masterbatch wherein the antiblock provides a further reduction in the blocking force of the resulting PE film.

Yet another object of the present invention is to produce a masterbatch wherein the slip agent is erucamide and addition of erucamide to the masterbatch results in a reduction in the CoF of the resulting PE film.

Another object of the present invention is to produce a masterbatch that significantly reduces haze and increases gloss in the resultant PE film. The masterbatch also results in the PE film having a reduced coefficient of friction. Furthermore the PE film produced using the inventive masterbatch exhibits an increase in stiffness and tear resistance as measured by secant modulus and Elemdorf Tear. Increased stiffness and tear resistance are both desirable properties in thin gauge PE film.

Another object of the present invention is to provide PE formulations and a masterbatch that is simple and easy to use.

A still further object of the present invention is to provide PE formulations that are economical to produce and are cost-effective in the production of PE films and articles.

Additional objects of the present invention will appear as the description proceeds.

BRIEF DESCRIPTION OF THE DRAWINGS

Various other objects, features and attendant advantages of the present invention will become more fully appreciated as the same becomes better understood when considered in conjunction with the accompanying drawings, in which like reference characters designate the same or similar parts throughout the several views.

FIG. 3 is a table showing the effect of the masterbatch of the present invention on melting temperature and crystallization temperature;

FIG. 4A is a table showing the results of comparative tests performed using a plurality of masterbatches;

FIG. 4B is a table showing the results of comparative tests performed using a plurality of masterbatches;

DETAILED DESCRIPTION OF THE PREFERRED EMBODIMENT

Figure 1:
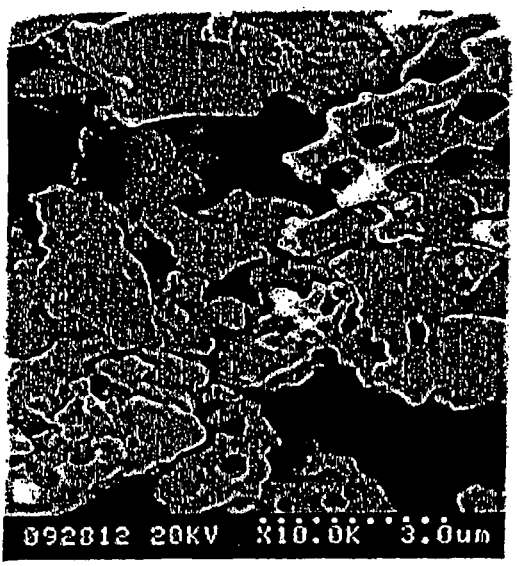
FIG. 1 are photographic depictions of prior art antiblocking agents used in masterbatches.
Figure 1:
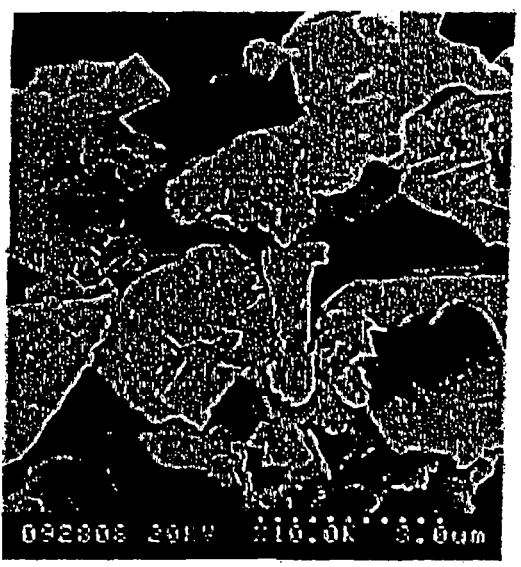
Figure 1:
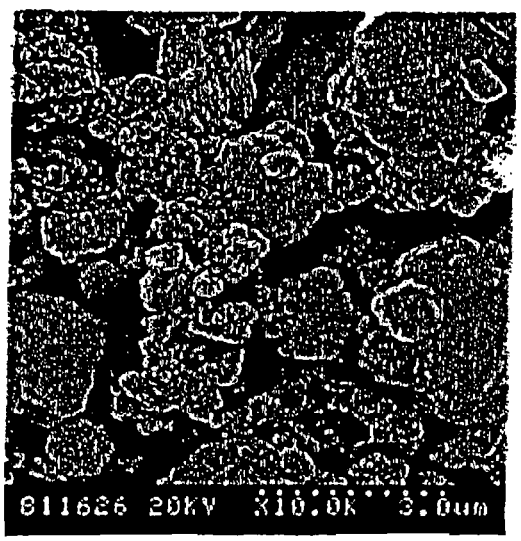
Figure 1:
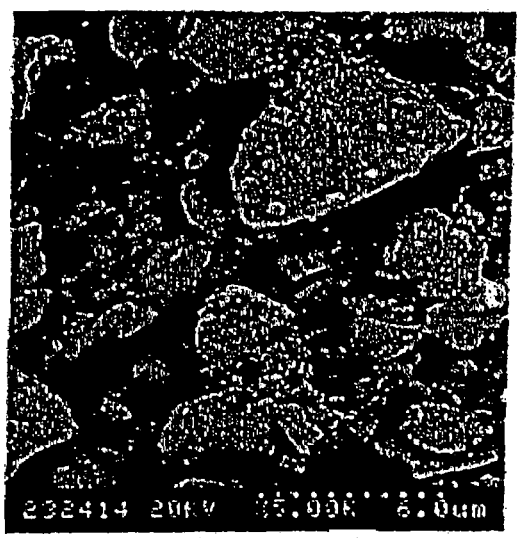

The following discussion describes in detail one embodiment of the invention and several variations of that embodiment. This discussion should not be construed, however, as limiting the invention to those particular embodiments. Practitioners skilled in the art will recognize numerous other embodiments as well. For a definition of the complete scope of the invention, the reader is directed to the appended claims.

PE is formed when ethylene gas is polymerized to produce polymers having a desired molecular weight. The chemical formula of PE is generally $(C_2\text{-}H_4)_n$, wherein n represents the number of chains used in forming the desired compound. PE is a stable and inert polymer and has a high resistance to chemical attack including alkalis, aqueous solutions, non-oxidizing acids, and to some extent even oxidizing acids. PE is very resistant to water and water vapor and has a very low water absorption compared to other plastics. Common uses for PE include flexible packing material represented in sheet form similar to the protective wrapping seen on food products. Other uses includes molded articles, such as toys, playground equipment, tanks for holding liquids, insulating telecommunications and power cables, and providing corrosion protection of steel pipes used in water distribution.

There are many different methods of producing PE. Specifically, if the manufacturer has a need for PE having predetermined properties, the manufacturer is able to develop or purchase a masterbatch which includes a PE resin along with a plurality of additives which are used to impart certain desired properties into the resultant PE film formed using the masterbatch. The present invention relates to an inventive masterbatch used in producing PE film.

Generally, it is known that additives such as antiblocks, clarifiers and slip agents are combined with a PE resin to produce a PE film with either the cast film process or the blown film process.

The clarifier used in the masterbatch of the present invention is BIS (p-ethylbenzylidene sorbitol). Alternatively, the clarifier used is a substituted di-benzylidene sorbitol, and preferably a di-ethyldibenzylidene sorbitol.

The masterbatch of the present invention includes a clarifier, an antiblock agent, and a slip agent combined in a LDPE carrier. The clarifier used in the masterbatch of the present invention is Bis (p-ethylbenzylidene sorbitol). The preferred antiblock agent used for combination with the LDPE resin is synthetic sodium calcium aluminosilica hydrate having a particle size provided within a range of between substantially 3-5 microns. The preferred slip agent for use in the masterbatch of the present invention is erucamide.

The masterbatch of the present invention includes:

| Ingredient | % by Weight. |
| --- | --- |
| LDPE | substantially between 55% and 85% |
| BIS (p-ethylbenzylidene sorbitol | substantially between 5% and 20% |
| Five (5) micron sodium calcium aluminosilica hydrate. | substantially between 5% and 20% |
| Erucamide | substantially 5% |

The above discussed masterbatch can be added to PE resin in amounts ranging from 0.5% to 3% by weight, with a preferred range of between at least 1% by weight to 2% by weight of the above masterbatch to the PE resin when making PE film. The properties of the resultant PE film will be described hereinafter with specific reference to FIGS. 1-4.

Additionally, the polyethylene composition formed using the masterbatch of the present invention may include adjuvant materials commonly employed in ethylene polymer compositions. These adjuvant materials include at least one of fillers, pigments, lubricants, antioxidants, light stabilizers, antistats, antifogs, modifiers and similar materials.

FIG. 1 shows a pictorial view of a plurality of prior art antiblocks used in PE formulations. The prior art antiblocking agents shown herein are diatomaceous earth (DE), talc, Silica A and Silica B. The antiblocking agents, when combined with the PE resin protrude from the surface. These protrusions from the surface of the PE film serve to increase the distance between two adjacent PE films thereby reducing the blocking force. The reduction in the blocking force prevents the films from sticking to one another and allows them to be easily separated.

These prior art antiblocks, while functionally effective, are not always desirable for use in all PE films. Specifically, the properties associated with each respective one of DE, talc, silica A and silica B, result in the PE film having an increased haze and a reduced gloss. This is due primarily to the shapes and sizes of the particles that form each of the shown antiblocks.

Another undesirable result of using one of the aforementioned prior art antiblocks is the increase in haze and reduction in gloss suffered by the resulting PE film. As these elements each have a known level of opacity associated therewith, the resulting PE film can be hazy or less transparent as well as less glossy.

Figure 2:
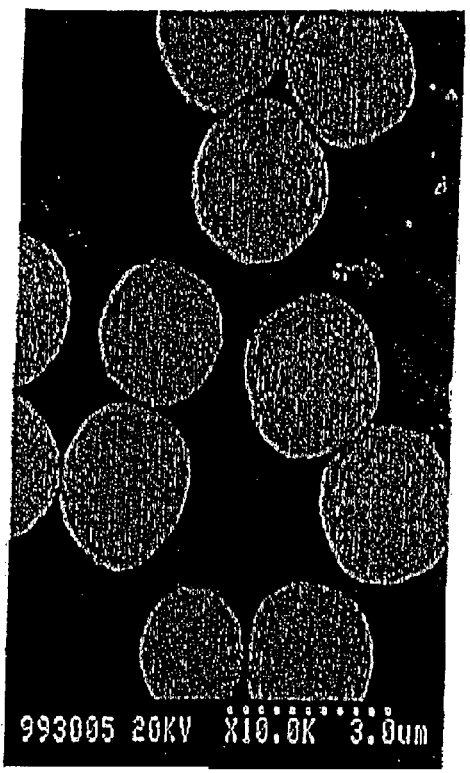
FIG. 2 is a photographic depiction of antiblocks used in the masterbatch of the present invention.
Figure 2:
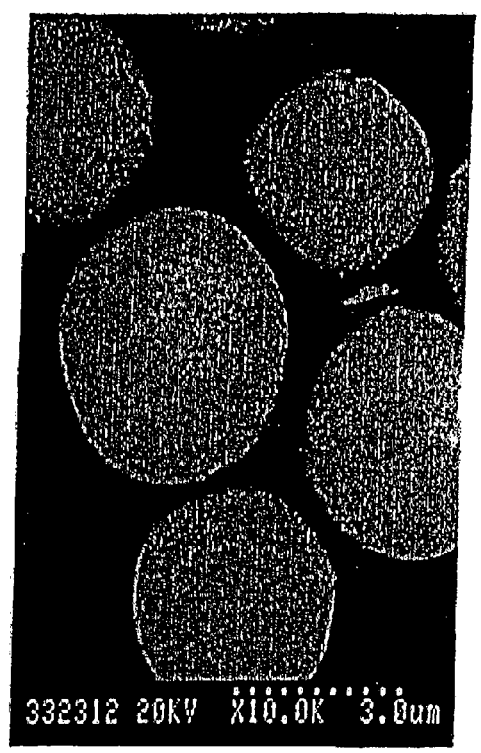

These drawbacks are corrected in the masterbatch of the present invention which makes use of sodium calcium aluminosilica hydrate having a particle size provided within a range of between substantially 3-5 microns as antiblock agents. FIG. 2 shows a pictorial view of both the above mentioned antiblocking agents.

As can be seen from FIG. 2, each of particles making up the sodium calcium aluminosilica hydrate are substantially spherical in shape. The spheres are similar in particulate size. The shape and size of the particles of sodium calcium aluminosilica hydrate having a particle size provided within a range of between substantially 3-5 microns allows a more even and uniform distribution along the surface of the PE film. The preferred antiblock agents mentioned above have fewer impurities than naturally occurring antiblocks and hence their impact on haze and clarity is less severe than the naturally occurring antiblocks.

Also, the PE films produced from the masterbatch of the present invention are glossier than prior art formulations. This is because of the narrower particle size distribution of these antiblocks combined with their lower porosity and surface area. Also the improved gloss is due to the change in the crystallization of the polymer due to the clarifier.

FIG. 3 shows a table depicting the effect of the masterbatch of the present invention on melting temperature and crystallization temperature. As shown in the first column is the percent by weight of the masterbatch used in a PE formulation. The first row shows a PE formulation that was formed without using the masterbatch of the present invention. The LLDPE formed without the present invention crystallizes at 107.6° C. and melts at 123.4° C. and the LDPE crystallizes at 97.6° C. and melts at 111° C. However, upon producing a PE film with the masterbatch of the present invention, the crystallization temperature increases which means there is a lower frost line. A PE film made using 1% by weight of the masterbatch of the present invention results in a LLDPE having a crystallization temperature of 113.3° C. and a LDPE having a crystallization temperature of 99.6° C. A PE film including 2% by weight of the masterbatch of the present invention results in an LLDPE having a crystallization temperature of 115° C. and a melting temperature of 124.4° C. The LDPE formed using 2% by weight of the masterbatch of the present invention has a crystallization temperature of 100.3° C. and melting temperature of 111.0° C.

These results are important because the higher the crystallization temperature the faster the crystallization. Furthermore, this faster crystallization occurs without a significant increase in the melting temperature. The faster rate of crystallization is advantageous in that it allows the PE film to be produced at a higher rate resulting in an increase in productivity. The faster rate of crystallization occurs because the clarifier nucleates the polymer by crystallizing at a higher temperature causing the polymer to crystallize around these nuclei.

FIGS. 4A and 4B are tables showing experimental results in comparative tests between PE film formulations including the masterbatch of the present invention and PE formulations not including the masterbatch of the present invention. The study known as the Customer $2^{nd}$ Trial performed in April 2004 was commissioned to test various properties associated with PE films.

Four PE film formulations were tested in the Customer study. The first formulation was a control sample of PE resin including 0.16% erucamide and 0.65% talc, hereinafter known as "control". The second formulation was a barefoot sample including the PE resin of the control without the additives, hereinafter known as "barefoot sample". The third formulation was a PE resin including 1% by weight of the masterbatch of the present invention, hereinafter known as "1% MB" and the fourth formulation was a PE resin including 2% by weight of the masterbatch of the present invention, hereinafter known as "2% MB". It should be noted that the PE resin in all of the above samples was the same formulation. The PE resin was a 65% 0.941 LLDPE and 35% 0.924 LDPE resin.

A plurality of properties for each of the above four formulations were tested using testing standards set forth by the American Society for Testing and Materials (ASTM). Each property tested and the results of each test will be discussed hereinbelow.

The first two properties tested were the Haze and Clarity of the resulting PE film. This test was performed in accordance with ASTM standard D1003 entitled "Standard Test Method for Haze and Luminous Transmittance of Transparent Plastics". The results show the control having a haze value of 7.43% and a clarity value of 92.8%. The barefoot formulation has a haze value of 5.56% and a clarity value of 96.6%. The 1% MB formulation has a haze value of 5.34% and a clarity value of 95.9%. The 2% MB formulation has a haze value of 5.0% and a clarity value of 95.0%. Thus, the 2% MB sample is 33% less hazy than the control sample.

The next properties tested were the MD Sec Modulus and the TD Sec Modulus The secant modulus indicates the stiffness of the film. The higher this value, the stiffer the film. MD (machine direction) and TD (transverse direction) would indicate that property changed due to orientation of film. The most desirable case is to have a PE film with balanced properties in both the machine and transverse directions. These properties were tested using the ASTM test D882 entitled "Standard Test Method for Tensile Properties of Thin Plastic Sheeting". The MD Sec Modulus of the control formulation is 23183 Psi. The MD Sec Modulus value of the barefoot formulation is 35616 Psi. The MD Sec Modulus value of the 1% MB formulation is 37687 Psi and the value of the 2% MB sample is 43546 Psi. The value of the 2% MB formulation is 88% greater than the value of the control formulation. The above data indicates that the MB formulation improves the stiffness of the film compared to the control. The TD Sec Modulus of the control formulation is 27217 Psi. The TD Sec Modulus value of the 1% MB formulation is 48722 Psi and the value of the 2% MB formulation is 55435 Psi. There was no TD Sec Modulus value for the Barefoot formulation. The value of the 2% MB formulation is 104% greater than the value of the control formulation. The above data shows that the MB formulation improves the stiffness of the film compared to the control.

The final relevant property tested upon which the use of the masterbatch results in a marked improvement is in the TD Elmendorf Tear value. The TD Elmendorf Tear value was tested using the ASTM test D1922 entitled "Standard Test Method for Propagation Tear Resistance of Plastic Film and Thin Sheeting by Pendulum Method". This test method covers the determination of the average force needed to propagate tearing through a specified length of plastic film or non-rigid sheeting after the tear has been started, using an Elmendorf-type tearing tester. In the control formulation, 345 grams of force were required to tear the film whereas in the barefoot formulation 312 grams were required to tear the film. In the 1% MB formulation, 405 grams were required to tear the PE film and in the 2% MB formulation, 516 grams were required to tear the film. Using the PE formulation having 2% of the masterbatch by weight resulted in an increase in tear resistance of 50% as compared to the control formulation. This shows a markedly stronger PE film than produced using prior masterbatches. This strength increase is due to the smaller spherulites, i.e. higher crystallinity due to the presence of the clarifier.

The results of the Customer study is a PE film having 33% less haze and 14% higher gloss. There is also a 104% increase in the TD Secant Modulus and an 88% increase in the MD Secant Modulus. Furthermore there is a 50% increase in the TD Elmendorf tear value as compared to the control sample along with a 27% reduction in dart drop.

It should be further noted that the PE resin used in the Customer study can be formed exclusively of 0.925 LLDPE as opposed to a LLDPE/LDPE combination mixture.

Figure 5:
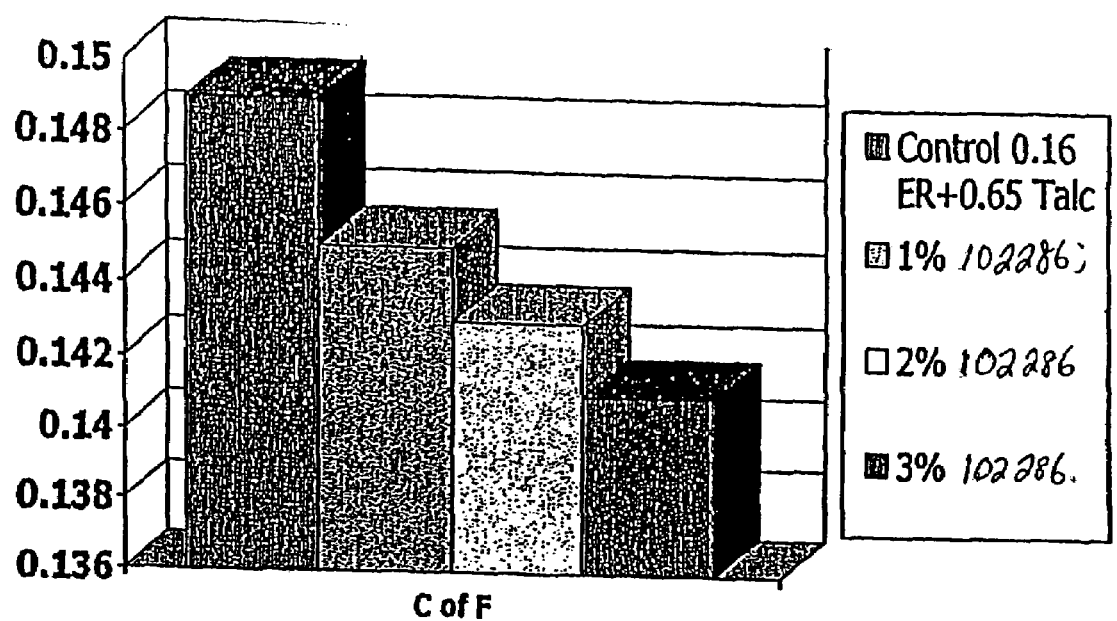
FIG. 5 is a bar graph showing the coefficient of friction of a control sample as compared to PE formation including the masterbatch of the present invention.

Additionally, the masterbatch of the present invention provides a decrease in the CoF. As shown in FIG. 5, a bar graph shows the coefficient of friction of a control sample as compared to PE formulation including the masterbatch of the present invention. The control sample is the same as the control sample used in the tests as described hereinabove with respect to FIG. 4. The graph in FIG. 5 shows the CoF value decrease as the percent of masterbatch by volume is increased from 1% to 3%. The PE formulation including 1% masterbatch by weight has a CoF of 0.145. The CoF value of the PE formulation including 2% masterbatch by weight is 0.141 and the CoF value for the PE formulation including 3% masterbatch by weight is 0.143. While the CoF value in the 3% formulation is less, it is still important to maintain a desired CoF which is exhibited in the 2% masterbatch formulation.

Figure 6A:
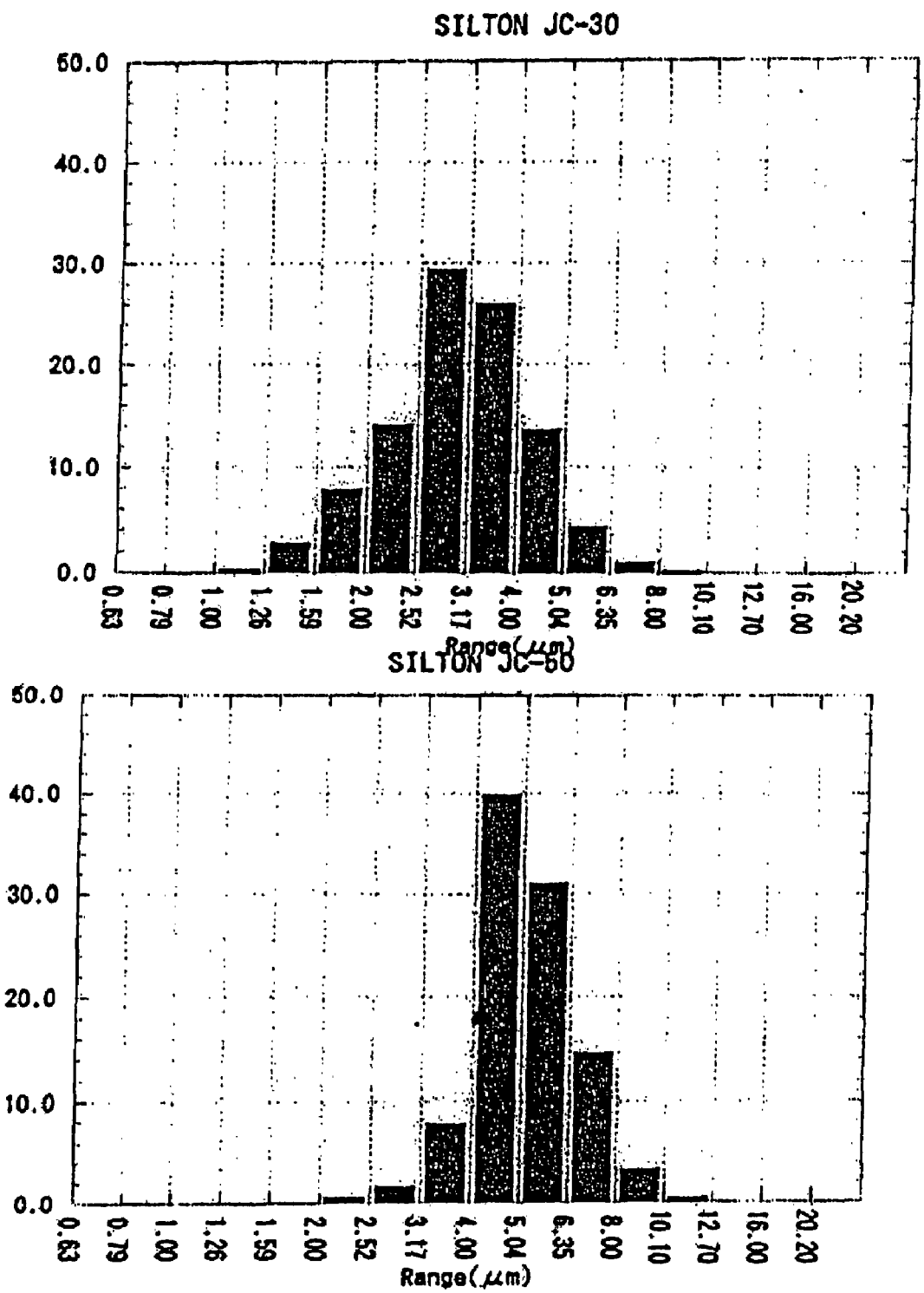
FIG. 6A is a bar graph of the average particle size of the sodium calcium aluminosilica hydrate antiblock for use in the masterbatch of the present invention.

FIG. 6A is a bar graph of the average particle size of the synthetic sodium calcium aluminosilica hydrate antiblock for use in the masterbatch of the present invention. The graphs in FIG. 6A show the percent by volume of the particle size of each of three (3) micron synthetic sodium calcium aluminosilica hydrate antiblock and five (5) micron synthetic sodium calcium aluminosilica hydrate antiblock measured in micrometers. The graphs show that the antiblocks of the present invention have a higher concentration of similar-sized particles. The majority (55%) of the particles that form the three (3) micron synthetic sodium calcium aluminosilica hydrate antiblock are between 3.17 and 4.00 micrometers in size, whereas the majority (71%) of the particles that form the five (5) micron synthetic sodium calcium aluminosilica hydrate antiblock are between 5.04 and 6.35 micrometers in size.

Figure 6B:
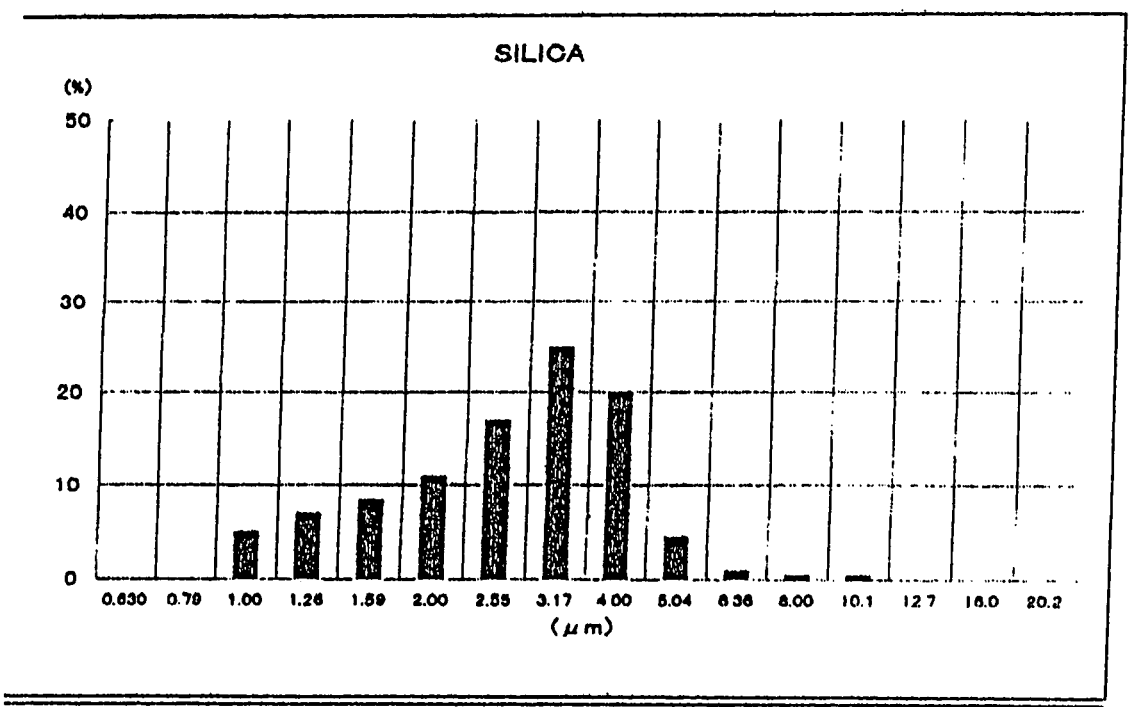
FIG. 6B is a bar graph of the average particle size of prior art antiblocks talc and silica for use in prior art masterbatches.
Figure 6B:
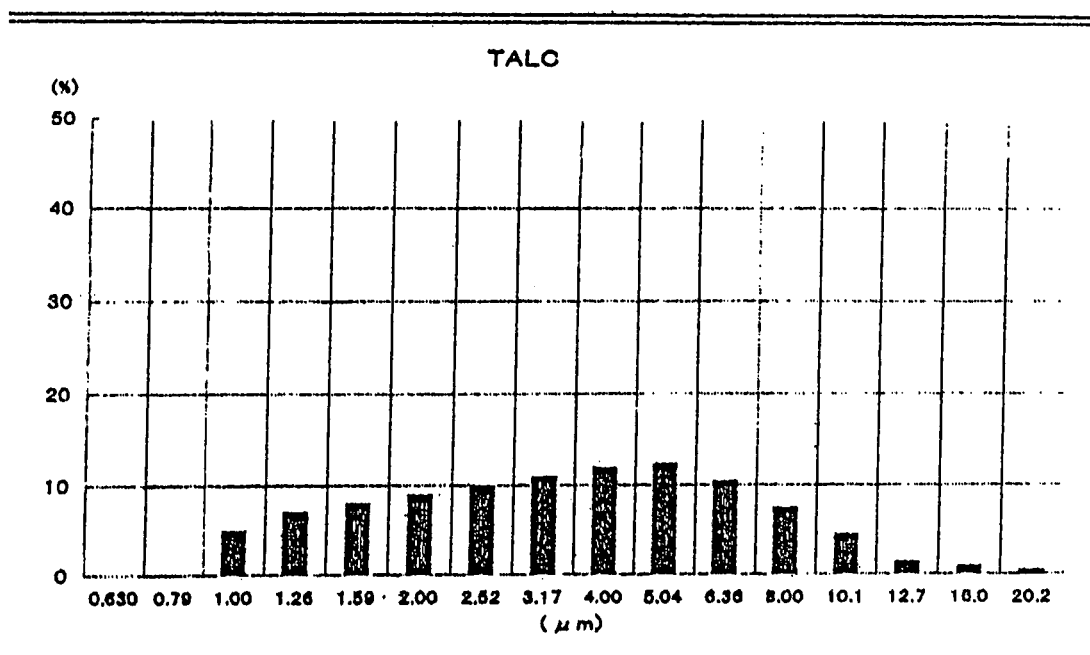

FIG. 6B is a bar graph of the average particle size of prior art antiblocks talc and silica for use in prior art masterbatches. The prior art masterbatches using either silica or talc as antiblock show a very different histogram of particle size by volume. With respect to silica, only approximately 45% of particles range in size between 3.17 and 4.00 micrometers. Additionally, the silica has a higher percentage (approx 40%) of particles that are between 1.00 and 2.55 micrometers in size. The silica has more particles per unit volume resulting in greater scattering of the light, i.e. increased haze. On the other hand, the talc has an even distribution of between 8% and 12% by volume of particles ranging in size between 1.00 and 10 micrometers. Talc increases the haze due to its platelet structure.

Figure 7:
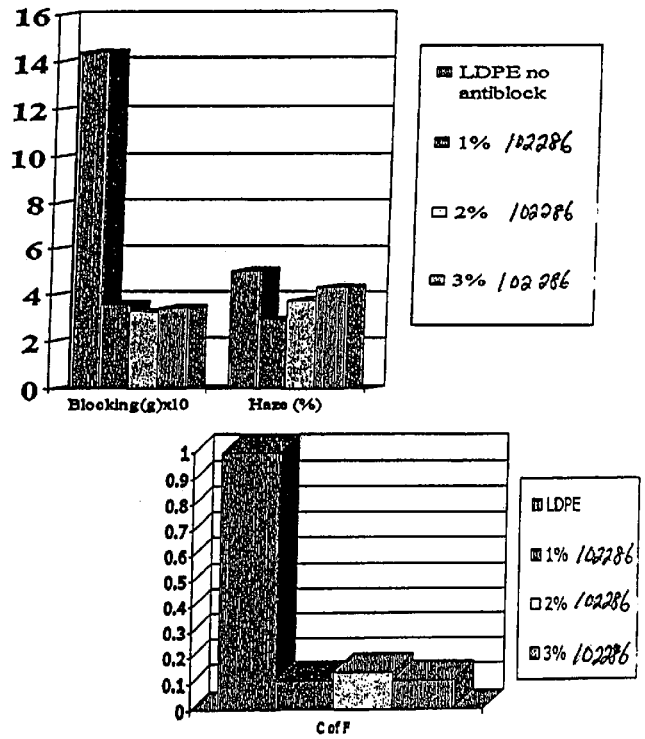
FIG. 7 are graphical representations showing the enhanced PE film formed using the masterbatch of the present invention in LDPE cast films.

FIG. 7 illustrates graphical representations of the enhanced PE film formed using the masterbatch of the present invention in LDPE cast films. The graphs show the results of testing the haze, blocking force and CoF for films formed using a 1% masterbatch, 2% masterbatch and 3% masterbatch. The resulting LDPE cast film has between a 26% and 42% reduction in haze and between a 75% and 77% reduction in blocking force. Also the CoF in the LDPE cast film ranges between 0.11 and 0.14.

Figure 8:
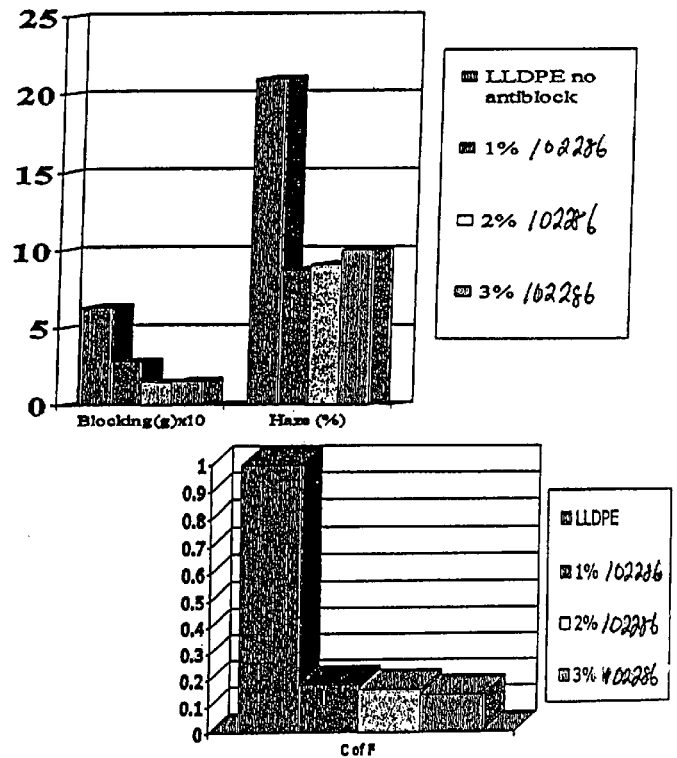
FIG. 8 are graphical representations showing the enhanced PE film formed using the masterbatch of the present invention in LLDPE cast films.

FIG. 8 illustrates graphical representations showing the enhanced PE film formed using the masterbatch of the present invention in LLDPE cast films. The graphs show the results of testing the haze, blocking force and CoF for films formed using a 1% masterbatch, 2% masterbatch and 3% masterbatch. The resulting LLDPE cast film has between a 52% and 60% reduction in haze and between a 56% and 77% reduction in blocking force. Also the CoF in the LDPE cast film ranges between 0.14 and 0.18.

Figure 9:
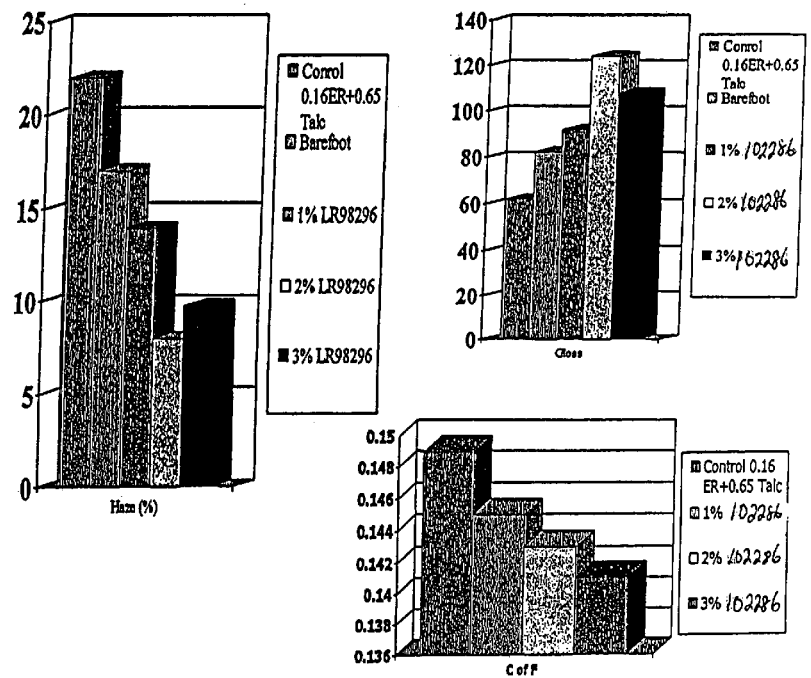
FIG. 9 are graphical representations showing the enhanced PE film formed using the masterbatch of the present invention in LLDPE blown films.

FIG. 9 illustrates graphical representations of the enhanced PE film formed using the masterbatch of the present invention in LLDPE blown films. The graphs shown herein display the results of tests conducted on the haze, gloss, CoF and the TD Elmendorf Tear values of blown LLDPE films formed using 1% masterbatch, 2% masterbatch and 3% masterbatch as compared to a control masterbatch as indicated. The resulting LLDPE blown film has a 65% reduced haze as compared to the control film and a 97% increase in gloss as compared to the control film. The TD Elmendorf Tear value shows an increase of 50% as compared to the control film. The control film has a CoF value of 0.149 whereas the lowest CoF of the tested films is 0.141.

Additionally information on a study performed on different PE films formed using the masterbatch of the present invention is discussed hereinbelow.

The data from a study conducted in April of 2004 entitled the Validation Trials is shown in Tables 1-3. Table 1 includes the guidelines followed in the Validation Trials including the makeup of the experimental and control films used to test comparative properties of each. As shown in Table 2, the study tested the haze, gloss, CoF value and blocking value of PE films formed from PE resins having 1% masterbatch, 2% masterbatch and 3% masterbatch by volume as compared to a barefoot film and a control film. The conclusions of this study are shown in Table 3 and show that films produced using the masterbatch of the present invention have a reduction in haze of up to 65% and an increase in gloss of up to 97%. The study also concluded that the preferred amount by weight of the masterbatch to be used in forming PE film is 1.2% by weight. It was also found that to improve the blocking value, the five (5) micron sodium calcium aluminosilica hydrate antiblock can be replaced with a three (3) micron sodium calcium aluminosilica hydrate antiblock.

TABLE 1

[Validation Trials - April 2004]

FILM PROCESSING CONDITIONS
7109 M control; (0.16% ER + 0.65% Talc)
7109 barefoot + 1, 2, 3% High Clarity Masterbatch 102286
1.25 mil (32u) blown LLDPE hexene copolymer 0.919 density film.
MACRO 2.5 inch FILM EXTRUDER
1) 8 inch 0.80 inch dual lip film die.
2) Extruder temp; 360-380 F. with 400-410 F. die temp Melt

TABLE 1-continued

[Validation Trials - April 2004]

Temp. 398 F.
3) Rate: 200 lbs/hr.
4) AMPS: 72% 7109 M
74% 1% 102286 High Clarity Masterbatch
76% 2, 3% 102286.
4) Frostline 19 inch with control, 1, 2, 3% 102286. No change noted.
5) Blow up ratio with 31.5 inch lay flat = 3.94
6) Cooling rate 50 F. air ring tiemperature

TABLE 2

[Validation Trials - April 2004]

|          | % HAZE | GLOSS | CoFF kinetic/static | BLOCKING |
|----------|--------|-------|---------------------|----------|
| Control  | 23     | 62    | .108/.149           | 26 g     |
| Barefoot | 17     | 82    |                     |          |
| 1% MB    | 14     | 92    |                     |          |
| 2% MB    | 8      | 125   |                     |          |
| 3% MB    | 9.8    | 108   | .115/.141           | 108 g    |
| (2% MB*  | 9.5    | 115   | .115/.141           | 25-30 g) |

*estimated properties substituting Silton JC-50 with PS-3)

TABLE 3

[Validation Conclusions]

Reduction of haze up to 65%
Increase in gloss up to 97%
2% of the 102286 gave the best performance To the accomplishment of the above and related objects, this invention may be embodied in the form illustrated in the accompanying drawings, attention being called to the fact, however, that the drawings are illustrative only, and that changes may be made in the specific construction illustrated and described within the scope of the appended claims.

It will be understood that each of the elements described above, or two or more together may also find a useful application in other types of methods differing from the type described above.

While certain novel features of this invention have been shown and described and are pointed out in the annexed claims, it is not intended to be limited to the details above, since it will be understood that various omissions, modifications, substitutions and changes in the forms and details of the device illustrated and in its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by letters Patent is set forth in the appended claims:

1. An ethylene polymer composition having improved optical properties comprising a predetermined amount of ethylene polymer resin, a predetermined amount of a di-ethyldibenzylidene sorbitol clarifying agent, and a predetermined amount of an amide slip agent.

2. The composition of claim 1, further comprising a high clarity anti-block agent.

3. The composition of claim 1, wherein said amide slip agent is erucamide.

4. The composition of claim 2, wherein said high clarity anti-block is synthetic hydrated sodium calcium aluminosilicate.

5. The composition of claim 4, wherein said synthetic hydrated sodium calcium aluminosilicate has a particulate size substantially of between at least three microns and five microns.

6. The composition of claim 1, wherein said ethylene polymer is at least one of a low-density ethylene polymer or copolymer and high density ethylene polymer.

7. The composition of claim 1, further comprising at least one adjuvant material.

8. The composition of claim 7, wherein said at least one adjuvant material is at least one of fillers, pigments, lubricants, antioxidant, light stabilizers, antistats, antifogs and modifiers.

9. The composition of claim 1, wherein said predetermined amount of clarifying agent is provided within a range of between substantially 0.1% by weight and 0.3% by weight.

10. The composition of claim 2, wherein said predetermined amount of high clarity anti-block is provided within a range of between substantially 0.1% by weight and substantially 0.3% by weight.

* * * * *